United States Patent
Di Angelo et al.

(10) Patent No.: US 7,614,363 B2
(45) Date of Patent: Nov. 10, 2009

(54) WINDOW MOUNTED PET HABITAT

(76) Inventors: Rio Di Angelo, 1345 S. Beverly Glen Blvd., No. 304, Los Angeles, CA (US) 90024; Natalie Alexander, 1345 S. Beverly Glen Blvd., No. 304, Los Angeles, CA (US) 90024

( * ) Notice: Subject to any disclaimer, the term of this patent is extended or adjusted under 35 U.S.C. 154(b) by 199 days.

(21) Appl. No.: 11/621,253

(22) Filed: Jan. 9, 2007

(65) Prior Publication Data

US 2007/0163512 A1     Jul. 19, 2007

Related U.S. Application Data

(60) Provisional application No. 60/759,705, filed on Jan. 18, 2006.

(51) Int. Cl.
*A01K 1/03*     (2006.01)
(52) U.S. Cl. .................. 119/28.5; 119/485
(58) Field of Classification Search .......... 119/28.5, 119/484, 485
See application file for complete search history.

(56) References Cited

U.S. PATENT DOCUMENTS

| | | | |
|---|---|---|---|
| 1,460,945 A | | 7/1923 | Chaplin |
| 2,251,067 A | | 7/1941 | Rendulich |
| 2,579,797 A | * | 12/1951 | Churchfield et al. ........ 119/28.5 |
| 3,173,398 A | * | 3/1965 | Raymond ................. 119/28.5 |
| 3,797,461 A | | 3/1974 | Breeden |
| 4,224,899 A | | 9/1980 | Cruchelow et al. |
| 4,291,645 A | | 9/1981 | Cruchelow et al. |
| 4,445,459 A | | 5/1984 | Julie |
| 4,497,279 A | | 2/1985 | Bell |
| D309,199 S | | 7/1990 | McMahon |
| 4,989,546 A | | 2/1991 | Cannaday |
| 5,002,012 A | * | 3/1991 | Pierrot ..................... 119/28.5 |
| 5,148,767 A | | 9/1992 | Torchio |
| 5,165,366 A | | 11/1992 | Harvey |
| 5,167,202 A | | 12/1992 | Bradford et al. |
| 5,195,457 A | | 3/1993 | Namanny |
| 5,337,697 A | | 8/1994 | Trimarchi et al. |
| 5,522,344 A | | 6/1996 | Demurjian |
| 5,782,205 A | | 7/1998 | Veras |
| 5,890,455 A | | 4/1999 | Donchey |
| 5,913,750 A | * | 6/1999 | Smithback ................... 482/54 |
| 5,975,017 A | | 11/1999 | Cameron |
| 6,089,247 A | | 7/2000 | Price |
| 6,360,689 B1 | * | 3/2002 | Weinert ................... 119/51.01 |
| 6,439,161 B1 | | 8/2002 | Clemmons |
| 6,470,829 B1 | | 10/2002 | Spangler et al. |
| 6,968,810 B2 | * | 11/2005 | Bishop ....................... 119/847 |

* cited by examiner

*Primary Examiner*—Yvonne R. Abbott
(74) *Attorney, Agent, or Firm*—Kelly Lowry & Kelley, LLP; Stuart O. Lowry

(57) ABSTRACT

A pet habitat for cats and the like is provided for secure and stable mounting on or within a window or the like, in a position suspended substantially at an outboard side of the window. The habitat includes an articulated frame carrying a foldable tent-like canopy for facilitated transport and/or storage in a compact collapsed configuration. A spring-loaded clamp bracket enables secure and stable clamp-on frame mounting onto a sill or the like of an open window, whereupon articulated frame components accommodate quick and easy deployment to an erected configuration. When erected, the foldable canopy is stretched over the frame to define a pet enclosure at the outboard side of the window with an access opening for pet ingress/egress from an inboard side of the window. A wall-mounted cat perch and walkway system may be used in combination with the window-mounted pet enclosure.

5 Claims, 10 Drawing Sheets

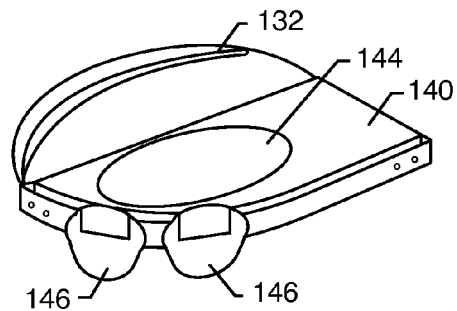
FIG. 36
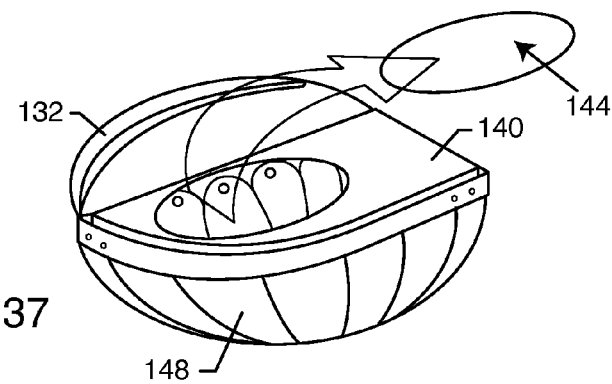
FIG. 37
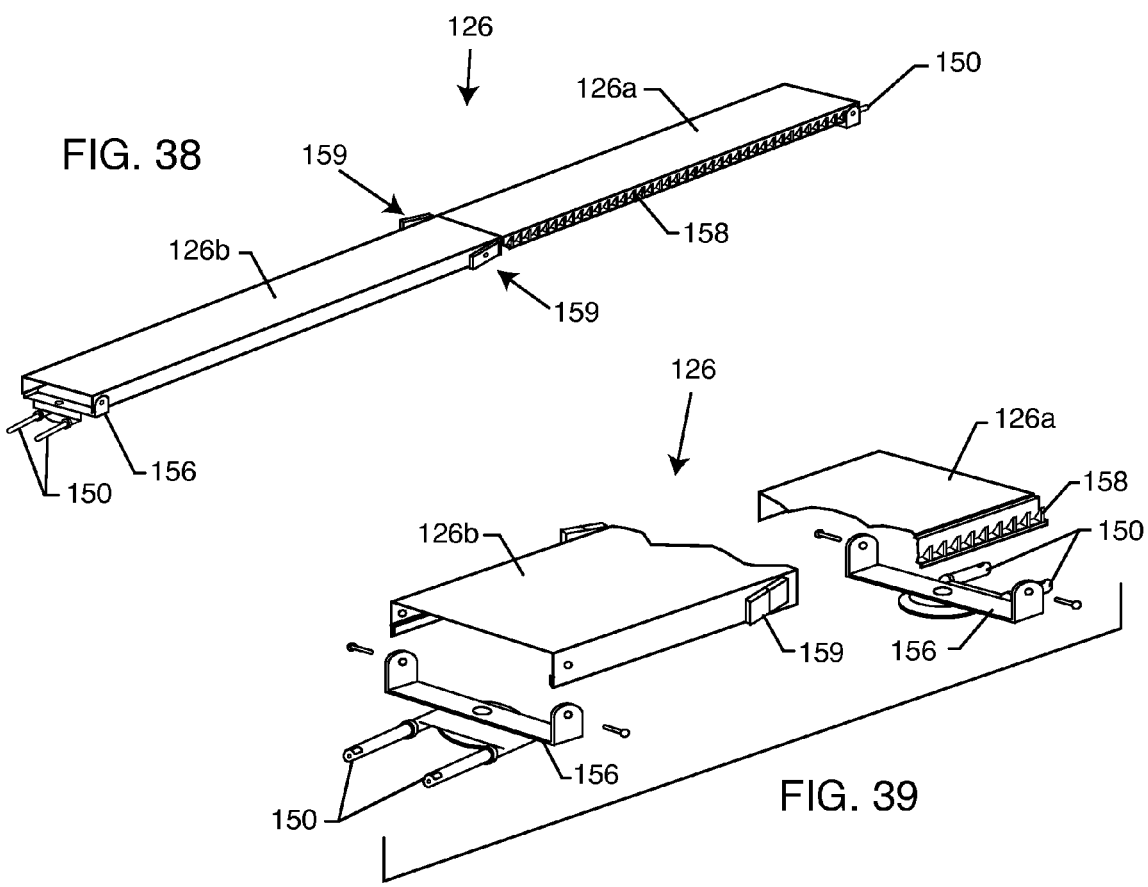
FIG. 38
FIG. 39

WINDOW MOUNTED PET HABITAT

BACKGROUND OF THE INVENTION

This invention relates generally to an improved cat habitat including a tent or enclosure of the type designed for installation onto or within a window of a residential dwelling or the like, to define a pet enclosure positioned substantially at an outboard side of the window but accessible from the inboard side for pet ingress and egress. More particularly, this invention relates to an improved self-clamping window tent for cats including a collapsible articulated frame carrying a foldable tent-like canopy, wherein the cat tent is adapted for quick and easy movement between a collapsed configuration for compact transport and/or storage and an erected configuration installed within an open window. In addition, the collapsible frame includes a spring-loaded clamp bracket for quick and easy mounting onto a window sill or the like in a secure and stable manner.

Window mounted pet habitats or enclosures are known in the art for mounting substantially at an outboard side of an open window, but wherein an access opening permits pet ingress and egress from an inboard side of the window. Such window mounted structures generally comprise a box-shaped apparatus designed for permanent mounting to window frame components in a manner positioning a substantial portion of the structure outside the window, but permitting pet access from the inside. See, for example, U.S. Pat. Nos. 1,460,945; 6,439,161; 4,291,645; 4,224,899; 5,522,344; 5,148,767; 5,167,202; 5,195,457; 5,337,697; 5,165,366; 5,975,017; 5,890,455; 5,782,205; 4,989,546; and 4,445,459. Such pet enclosures are frequently intended for use by one or more cats, and sometimes incorporate a litter box or the like that is conveniently located outside the residence.

While such window mounted pet enclosures generally provide one or more pets with access to fresh air and sunshine associated with the outdoors, but without permitting the pet unattended freedom to roam outside, the construction and mounting of prior window mounted pet enclosures has been less than satisfactory. In some cases, the pet enclosure is designed for permanent or semi-permanent mounting onto the window, whereby removal of the pet enclosure can be difficult and inconvenient. Other pet enclosure designs suitable for quick and easy installation and/or removal from the window have not provided a mounting means adapted for secure and stable mounting onto window sills of different sizes and shapes. In addition, many prior pet enclosures have not be designed for quick and easy movement between a highly compact collapsed state for optimal portability and/or storage between uses, and a fully erected state for secure and stable mounting onto a selected window.

The improved self-clamping window tent for cats or pet enclosure of the present invention overcomes these problems and disadvantages by providing a collapsible construction suitable for quick, easy, and substantially fail-safe movement between collapsed and fully erected positions, and further including means for quick and easy mounting onto a window sill of variable size and shape in a highly secure and stable manner.

SUMMARY OF THE INVENTION

In accordance with the invention, an improved pet habitat for cats and the like is provided for secure and stable mounting on or within a window or the like, in a position suspended substantially at an outboard side of the window. The habitat comprises a collapsible structure including a foldable tent-like canopy carried on an articulated frame for facilitated transport and/or storage in a collapsed configuration. The frame includes a spring-loaded clamp bracket adapted for secure and stable clamp-on mounting onto a sill or the like of an open window, whereupon the articulated frame components are quickly and easily deployed to an erected configuration. In the erected configuration, the foldable canopy is stretched over the frame to define a pet enclosure at the outboard side of the window.

In one preferred form, the clamp bracket comprises a first or inboard-side tubular element telescopically interfitted with a second or outboard-side tubular element. A pair of inboard-side and outboard-side clamp plates are respectively carried by the first and second tubular elements in opposed relation. At least one biasing spring urges the first and second tubular elements telescopically toward each other for correspondingly urging relative displacement of the clamp plates toward each other. When the articulated frame is oriented to extend through an open window or the like, the inboard-side and outboard-side clamp plates are spring-biased toward seated engagement with opposite sides of a window sill or a building wall structure adjacent the window sill for securely mounting the articulated frame relative to the open window. A latch mechanism can be provided for releasibly locking the tubular elements in an extended orientation with the clamp plates spaced apart by a substantial distance to facilitate initial mounting through the open window, wherein the latch mechanism is releasible to permit spring-loaded displacement of the clamp plates into secure seated engagement with the window sill or the like.

The frame includes additional articulated components which are then deployable quickly and easily from an initial collapsed configuration to an erected state at the outboard side of the open window. The foldable canopy is carried by such additional articulated components and is stretched and/or draped thereover for cooperatively defining, in the erected state, the pet enclosure at the outboard side of the open window. In the preferred form, the foldable canopy includes waterproof or water-resistant characteristics to maintain the interior of the pet enclosure in a substantially dry state during inclement weather conditions. In addition, the foldable canopy is desirably configured to promote air circulation through the pet enclosure. A divider panel of preferably transparent construction is supported generally in the plane of the window, and defines an access opening for pet ingress and egress therethrough to access the pet enclosure. In one form, the pet enclosure may carry a litter box or the like.

One or more expansion wall adapters are provided for removable mounting onto the articulated frame, to effectively close any residual space between the installed frame and the adjacent window structure. The expansion wall adapters may include one or a pair of horizontally extensible wall panels for use in closing residual space between the frame and an adjacent window sash of a double hung window or the like. A vertically extensible wall panel may be provided for closing residual space between the frame and an adjacent window sash of a horizontally sliding window.

The cat perch and walkway system comprises at least one and preferably multiple catwalk ramps mounted along an inboard side of a building wall to extend preferably between a pair or cat perch units. A first cat perch unit may be defined generally by the first or inboard-side tubular element of the articulated frame disposed at an inboard side of a building window. One or more additional or second cat perch units can be secured to the inboard side of a building wall at one or more suitable locations spaced horizontally and/or vertically from the first unit. The catwalk ramps are adapted for quick and easy connection between a selected pair of the cat perch units to accommodate pet travel therebetween. Each cat perch unit may include a horizontally oriented or basket-shaped resting site, and/or include auxiliary elements such as feeding and/or watering bowls and the like.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 36 is a perspective view showing one alternative cat perch assembly;

FIG. 37 is another perspective view depicting a further alternative cat perch assembly;

FIG. 38 is a fragmented perspective view of adjustable length catwalk components; and FIG. 39 is an exploded and fragmented perspective view of the adjustable length walkway components.

DETAILED DESCRIPTION OF THE PREFERRED EMBODIMENT

Figure 1:
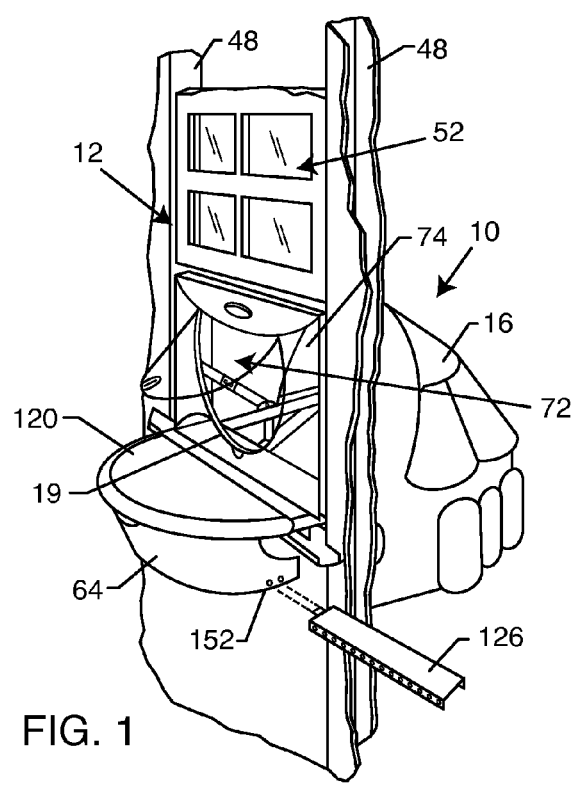
FIG. 1 is an inboard-side perspective view, in fragmented and partially exploded form, depicting a pet habitat constructed in accordance with the present invention for clamp-on installation within an open residence window.
Figure 3:
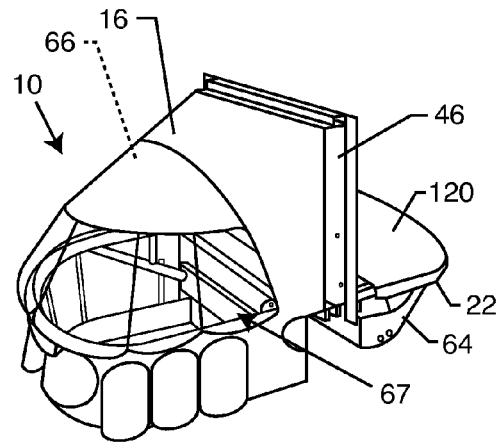
FIG. 3 is an outboard-side perspective view of the pet habitat in an erected configuration.
Figure 4:
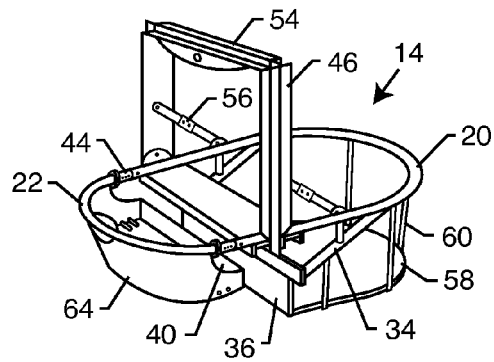
FIG. 4 is in inboard-side perspective view showing an articulated frame for the pet habitat in an erected configuration.
Figure 2:
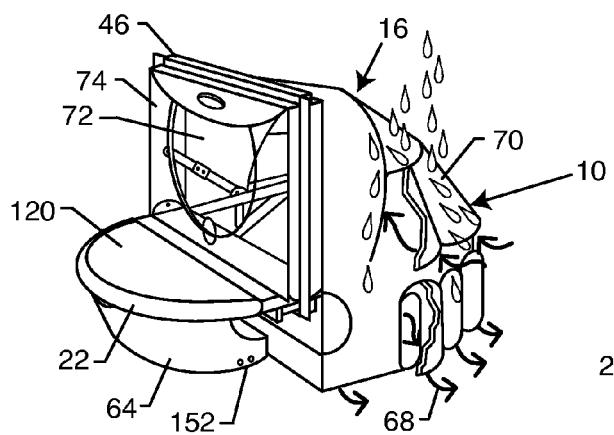
FIG. 2 is an inboard-side perspective view similar to FIG. 1 and illustrating the pet habitat in an erected configuration, but omitting the window and related components thereof.
Figure 5:
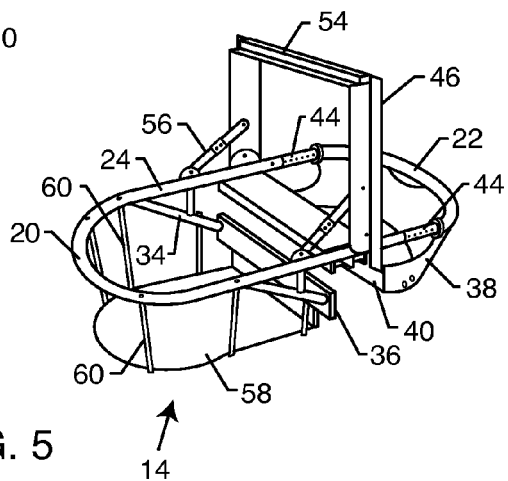
FIG. 5 is an outboard-side perspective view of the articulated frame in an erected configuration.
Figure 6:
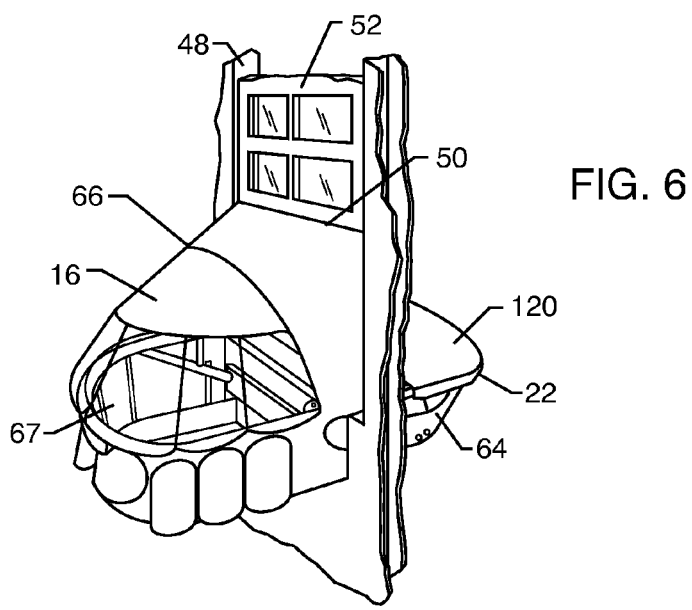
FIG. 6 is an outboard-side perspective view of the pet habitat, similar to FIG. 1, and showing the pet habitat mounted within an open residence window.

As shown in the exemplary drawings, an improved pet habitat includes a window-mounted tent-like pet enclosure referred to generally in FIGS. 1 and 2 by the reference numeral 10 for quick and easy removable mounting onto or within an open window 12. The tent enclosure 10 generally includes an articulating frame 14 and related foldable tent-like canopy 16 adapted for quick and easy deployment between a collapsed configuration (FIGS. 12-13) for compact transport and/or storage, and an erected configuration (FIGS. 1-6 and 16-17) mounted onto the window 12 in a highly secure and stable manner. In this erected state, the pet enclosure 10 is mounted substantially at the outside or exterior side of the window 12 in a suspended manner, while providing pet ingress and egress with respect thereto from the inside or indoor side of the window 12. The pet enclosure 10 is particularly suited for cats, and may be combined with a perch and walkway system 17 (FIGS. 31-39) adapted for mounting onto adjacent walls 18 at an indoor side of the window 12.

The pet enclosure 10 of the present invention thus provides a window-mounted tent structure to afford a house pet such as a cat with controlled access to an outdoor environment, for purposes of enjoying outside light and air. The invention is designed for simple yet stable clamped mounting onto a typical window 12 having a range of different common types, sizes, and interior and/or exterior sill or window frame configurations of the type used in a typical residential building such as a house or apartment, such as a double-hung window 12 of the type shown in the illustrative drawings at FIGS. 1, 6, 20-21 and 31, or a sliding window 12' of the type shown in FIGS. 10-11. In addition, whenever desired, the invention can be disassembled from the window 12 and quickly returned to the collapsed state for compact transport or storage.

The pet enclosure 10 generally comprises the articulated frame 14 constructed from relatively lightweight tubular components which carry the flexible foldable canopy 16 constructed from one or more lightweight fabric-based or similar tent-like material such as canvas or nylon-based fabric of the like. The frame 14 has an articulating construction to accommodate quick and easy unfolding movement from a compact collapsed configuration as viewed in FIGS. 12-13, to a fully erected configuration as viewed in FIGS. 4-5 and 16-17. Conversely, the articulating frame is quickly and easily returned from the erected state to the compact collapsed state. The foldable canopy 16 is carried by the frame 14 for automatic deployment therewith between the collapsed and erected configurations. In the erected state installed within a window 12 or the like, as viewed in FIGS. 1, 6, 21-22 and 31, the pet enclosure 10 is suspended substantially at an outboard or outdoor side of the window 12, while presenting an upwardly arched or curved profile that remains stable during windy weather conditions. An access opening 19 (FIGS. 1-2, 18-20, 23-28, and 31-32) is provided substantially within the plane of the window 12 for pet ingress and egress from the inboard or indoor side of the window.

Figure 8:
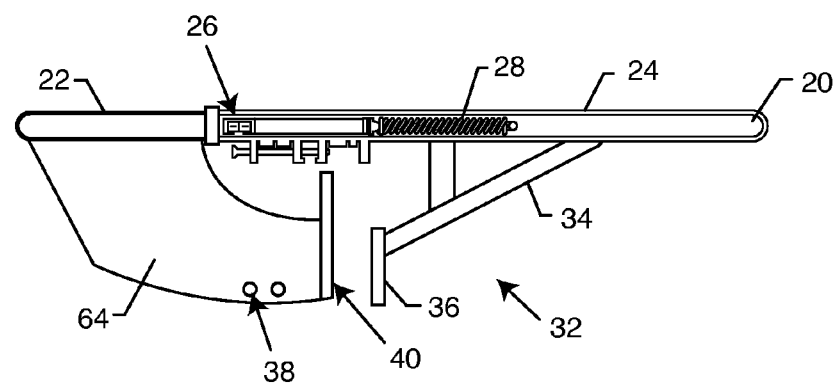
FIG. 8 is a side elevation view similar to FIG. 7, but showing the clamp bracket in a collapsed state.
Figure 9:
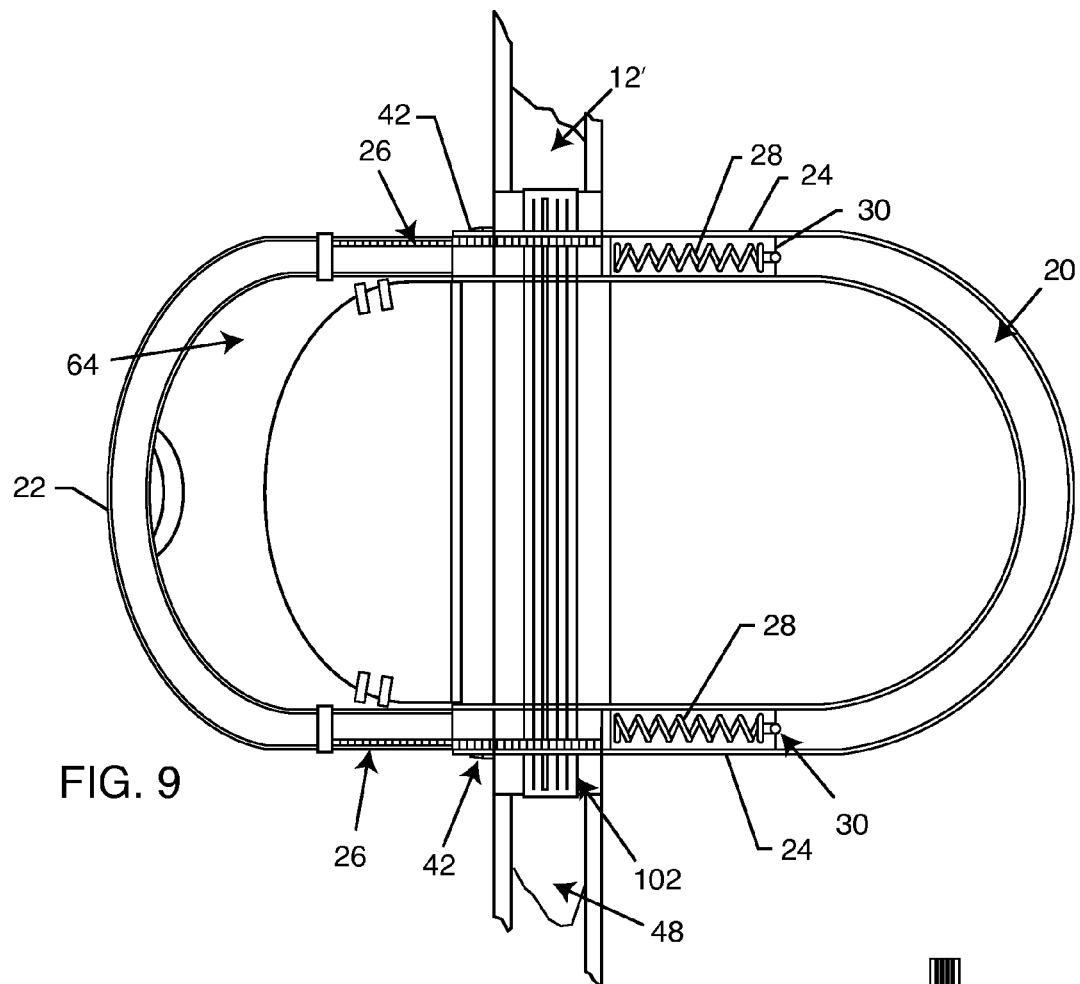
FIG. 9 is a top plan view of the clamp bracket shown installed within an open residence window.

The articulating frame 14 of the pet enclosure 10 includes first and second, outboard and inboard-side, generally U-shaped telescopically interfitting tubular frame elements 20 and 22. More particularly, as viewed best in FIGS. 7-9, the outboard-side U-shaped frame element 20 has a pair of generally parallel frame arms 24 having a diametric size for slidably and telescopically receiving a corresponding pair of generally parallel frame arms 26 on the inboard-side frame element 22. A pair of clamp springs 28 are mounted as by means of pins 30 within the interfitted pairs of frame element arms 24, 26 and function to spring-draw the smaller frame arms 26 slidably into the larger frame arms 24.

The two tubular frame elements 20, 22 additionally carry and define a clamp bracket 32 (FIGS. 7-8) for use in quickly and easily clamp-on mounting the articulated frame 14 onto the sill of the like of the open window 12. In this regard, the illustrative drawings show depending struts 34 on the outboard-side frame element 20 supporting an outboard-side clamp jaw 36 for engaging an outboard side of the window sill or underlying building wall structure, when the frame 10 is mounted onto the window. Similarly, the inboard-side frame element 22 carries depending struts 38 which in turn support an inboard-side clamp jaw 40 for engaging and inboard side of the window sill or underlying building wall structure.

A pair of pivotally mounted latches 42 (FIG. 9) carried at the free ends of the larger frame arms 24 engage ratchet-like detents 44 (FIGS. 4-5) in the smaller frame arms 26 to releasibly lock the frame arms in a selected telescopic position relative to each other. These latches 42 can thus be manipulated relative to the detents 44 to permit manual extension of the frame arms 24, 26 against the clamp springs 28 for spreading and then temporarily retaining the clamp jaws 36, 40 in a spread-apart relation (FIG. 7) to facilitate frame mounting onto the window 12 or 12', followed by release for displacement of the clamp jaws 36, 40 into spring-loaded clamp-on engagement (FIG. 8) with the sill or sill structure, (i.e., the building wall structure immediately underlying the sill) for secure mounting of the pet enclosure 10 onto the window 12 or 12'. If desired, the latches 42 can then be re-set to lock the frame 14 securely onto the open window.

The articulated frame 14 further includes an upper frame member 46 which is pivotally mounted on the outboard-side tubular frame element 20 near the inboard free ends of the frame arms 22. This upper frame member 46 is adapted for upward swinging movement from generally collapsed position (FIG. 12) in close overlying and generally parallel relation with the tubular frame element 20 to a generally vertically upright position (FIG. 16). As shown, this upper frame member 46 has a generally squared-off shape, to define side and upper margins for relatively close-fit engagement with adjoining window structures such as the side frame 48 and the lower edge 50 of an open double hung window panel 52 (FIGS. 1, 6, 21-22, and 31). Conveniently, this upper frame member 46 may carry a resilient seal 54 for substantially sealed, or leak-free engagement with these window structures. Articulated lock brackets 56 (FIGS. 4-5, 14-17 and 30) extend angularly between the frame arms 22 and the sides of the upper frame member 46 for releasibly locking and retaining the upper frame member 46 in the deployed position.

The outboard-side tubular frame element 20 further supports a floor 58 which may be suspended by stringer cables 60 from the frame element 20. This floor 58, if desired, may optionally support a removable litter box or pet bed 62, as viewed in FIG. 30. Similarly, the inboard-side tubular frame element 22 supports a tray 64, wherein this tray 64 may be constructed from a sufficiently stiff molded plastic or the like to additionally serve as the onboard-side strut 38 supporting the inboard-side clamp jaw 40. The floor 58, and/or the litter box 62 may also be conveniently constructed from lightweight and relatively economical plastic components.

The foldable canopy 16 is mounted onto and carried by the articulated frame 14 for automatic movement between the collapsed and erected configurations with the frame. In this regard, edge margins of the canopy 16 are suitably seamed for slide-on or other suitable attachment to and over the frame components. Accordingly, as the frame components are deployed, the canopy 16 is drawn or stretched over the frame components to provide the desired pet enclosure at the outboard or outdoor side of the window 12. Arched support ribs 66 may be integrated into the canopy 16 for supporting and retaining the deployed flexible canopy material in an upwardly arched configuration as shown. In addition, the canopy 16 can be constructed to include one or more relatively transparent zones 67 (FIG. 3) formed from a mesh fabric material or the like for increased light and air circulation through the pet enclosure while preventing entry of insects and other outdoor pests. Alternatively, or in addition, the canopy 16 can be formed in layers for improved downflow circulation as illustrated by arrows 68 in FIG. 2. Still further, if desired, a water impermeable rain hood 70 (FIG. 2) can be provided for quick and easy mounting over the canopy 16 by means of Velcro-type fasteners or the like to prevent water intrusion in inclement weather.

Figure 7:
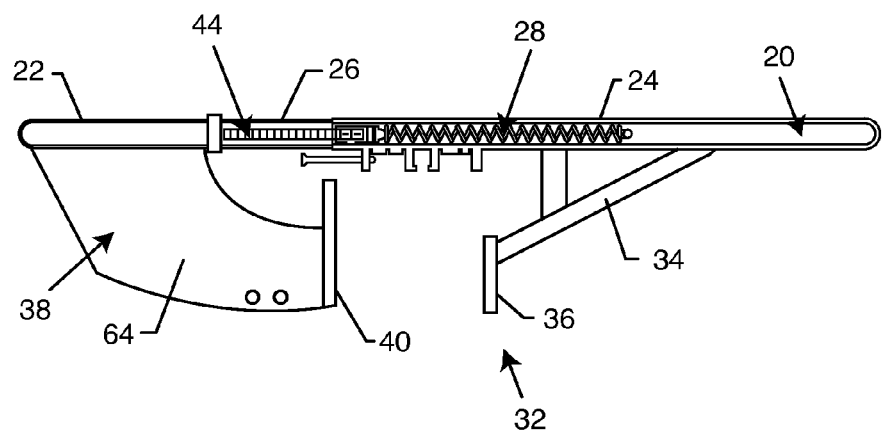
FIG. 7 is a somewhat schematic side elevation view depicting a clamp bracket forming a portion of the articulated frame in an expanded state.
Figure 12:
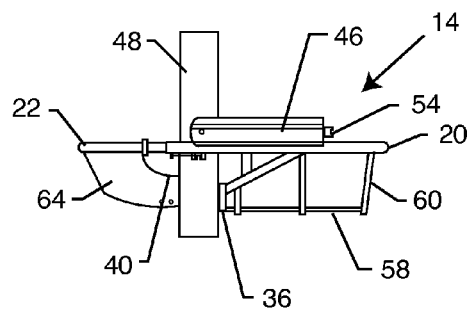
FIG. 12 is a somewhat schematic side elevational view illustrating initial placement of the articulated frame, in a collapsed configuration, through an open window.
Figure 13:
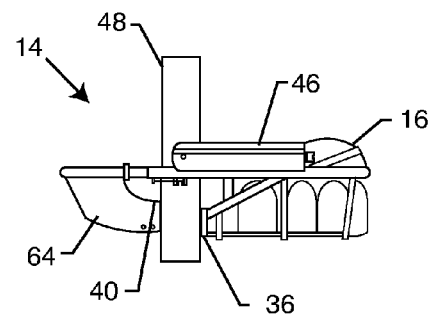
FIG. 13 is a side elevational view similar to FIG. 12, and showing the articulated frame in the collapsed configuration with the foldable canopy carried thereby.
Figure 14:
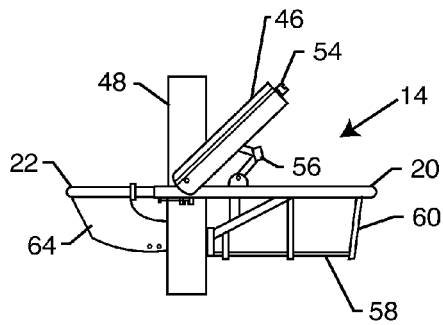
FIG. 14 is a side elevational view similar to FIG. 12, and depicting partial movement of the articulated frame from the collapsed configuration toward a deployed configuration.
Figure 15:
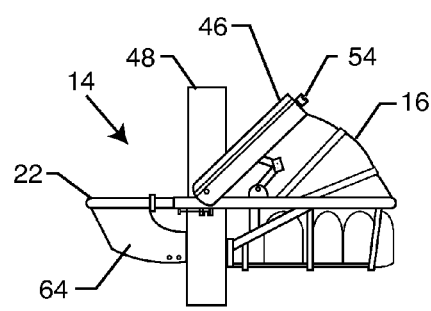
FIG. 15 is a side elevational view similar to FIG. 14, and showing the foldable canopy carried by the articulated frame.
Figure 16:
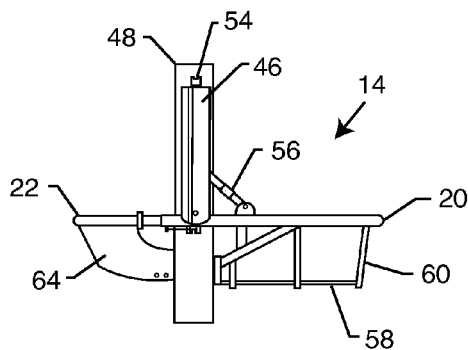
FIG. 16 is a side elevational view similar to FIGS. 12 and 14, and illustrating the articulated frame in a deployed configuration.
Figure 17:
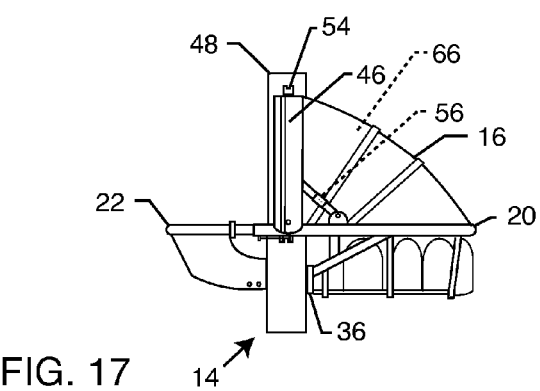
FIG. 17 is a side elevational view similar to FIG. 16, and showing the foldable canopy carried by the articulated frame.
Figure 18:
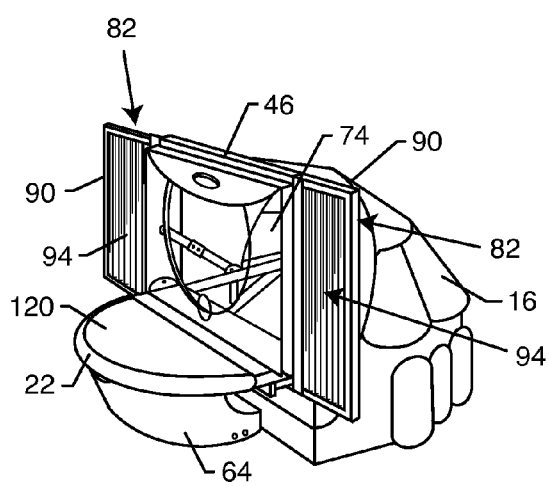
FIG. 18 is an inboard-side perspective view similar to FIG. 2, and further illustrating an expansion wall adapter including a pair of horizontally extensible wall panels for use in a double hung window.
Figure 20:
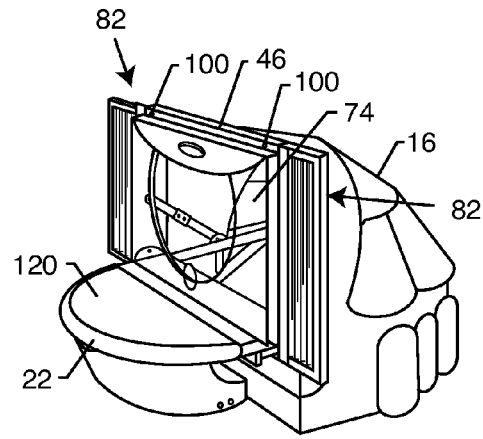
FIG. 20 is an inboard-side perspective view similar to FIG. 18, but showing the extensible wall panels in partially extended positions.

FIGS. 12-17 illustrate deployment of the pet enclosure 10 within an open window 12, wherein FIGS. 12, 14 and 16 show the articulated frame 14 without the canopy 16, whereas FIGS. 13, 15 and 17 show the canopy 16 on the articulated frame. As shown in FIGS. 12-13, the unit is placed within the open window frame 48 in a collapsed state, with the upper frame member 46 oriented in generally parallel overlying relation with the tubular frame elements 20, 22. The clamp bracket 32 is preferably expanded (as shown in FIG. 7) by appropriate manipulation of the latches 42 to stretch the clamp springs 28 and retain the clamp jaws 36, 40 in a spread-apart orientation for facilitated unit placement with the outboard-side and inboard-side frame elements 20, 22 bridging the open window frame 48. The latches 42 are then manipulated to release the clamp springs 28 in a manner causing the clamp jaws 36, 40 to advance toward each other into secure clamped engagement with the window sill, or with the building wall structure immediately underlying the window will. In this position, the clamp bracket 32 securely retains the unit on the window.

In this clamp-mounted position, the upper frame member 46 is then pivotally displaced from the collapsed position (FIG. 12) toward the deployed position (FIG. 16). As this movement proceeds, the articulated lock brackets 56 pivotally extend and then displace sufficiently over-center for releasably locking and retaining the upper frame member 46 generally within the plane of the window 12. FIG. 14 shows an intermediate position approximately mid-way between the collapsed position of FIG. 12 and the deployed position of FIG. 16.

Such manipulation of the articulated frame 14 from the collapsed to the deployed states is accompanied by correspondingly displacement of the canopy 16 from the collapsed (FIG. 13) to the deployed (FIG. 17) state. FIG. 15 shows the frame 14 with canopy 16 thereon in an approximate mid-way position corresponding with FIG. 14. In the deployed state (FIG. 17, the canopy 16 cooperates with the outboard side of the articulated frame 14 to define the desired pet enclosure suspended generally at an outboard side of the window 12.

The upper frame member 46, in the deployed state, defines the access opening 19 for pet movement from the inboard or indoor side of the window 12 to the pet enclosure at the outboard side, and vice versa. FIGS. 1-2, and 28-29 show this access opening 19 in the form of a flap 72 formed in a divider panel 74 adapted for mounting generally coplanar with the upper frame member 46. More particularly, in one preferred form, this divider panel 74 comprises a transparent plastic sheet so that the interior of the pet enclosure 10 can be observed from the indoor side of the window 12, with the flap 72 normally retaining the access opening 19 in an effectively closed condition without significantly impeding pet ingress and egress therethrough. In addition, in a preferred form (as shown best in FIGS. 28-29), the divider panel 74 may be adapted for quick and easy removable mounting onto the upper frame member 46, as by means of outwardly protruding pivot pins 76 near the opposed lower margins thereof for quick and easy seated engagement within generally L-shaped slots 78 formed in the upper frame member 46. With this design, the divider panel 74 can be pivotally seated on the upper frame member 46, and then rotated into coplanar alignment therewith for removable attachment of an upper margin to the upper frame member 46 as by means of Velcro-type fastener elements 80. Alternative fastener elements, such as a magnetic or mechanical catch can be used.

One or more expansion wall adapters may be provided for removable mounting onto the articulated frame 14, to effectively close any residual space between the installed frame and the adjacent window structure. FIGS. 18-22 show such wall adapters in the form of a pair of horizontally extensible wall panels 82 for use in closing residual space between the window side frame 48 and the adjacent movable window sash or panel 52 of a double hung window 12 or the like. By contrast, FIGS. 23-25 show a vertically extensible wall panel 86 for closing residual space between the adjacent window frame (not shown) and an adjacent movable window sash (FIGS. 10-11) of a horizontally sliding window 12'.

Figure 19:
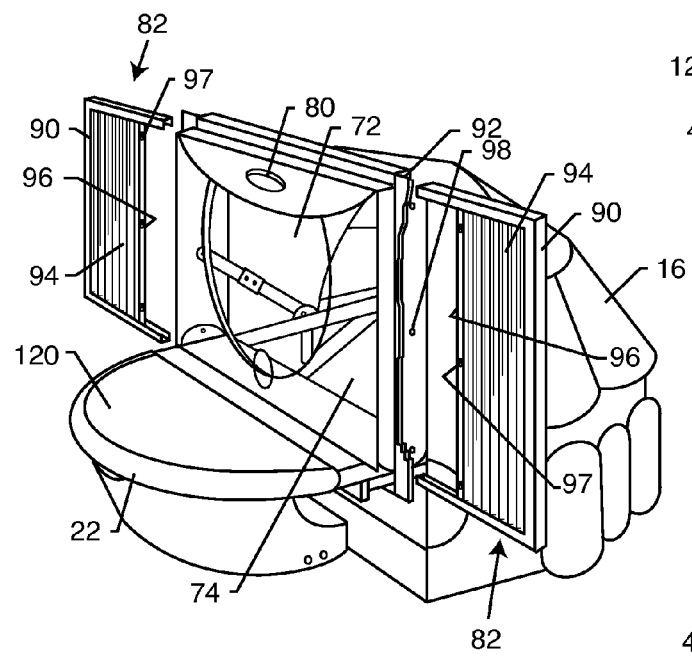
FIG. 19 is an inboard-side perspective view similar to FIG. 18, but showing the extensible wall panels in exploded relation.
Figure 21:
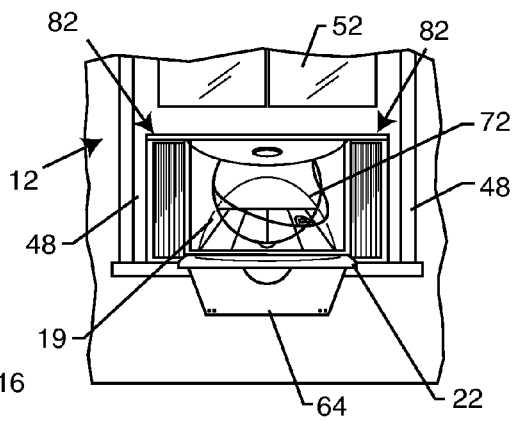
FIG. 21 is an inboard-side elevational view showing the pet habitat of FIGS. 18-20 installed within an open double hung window.
Figure 22:
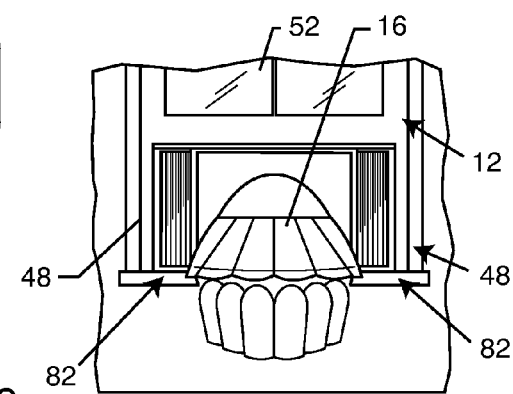
FIG. 22 is an outboard-side elevational view similar to FIG. 21, and showing the pet habitat of FIGS. 18-20 installed within an open double hung window.

More particularly, as viewed in FIGS. 18-22, the horizontally extensible wall panels 82 each comprises an open-sided frame element 90 having upper and lower frame legs sized for slide-fit, telescopic reception into open-ended channels 92 formed respectively at the upper and lower ends of the upper frame member 46 of the articulated frame 14. This open-sided frame element 90 supports an accordion-like collapsible or pleated wall sheet 94 having an inboard edge 96 adapted for releasible connection to the adjacent side margin of the upper frame member 46, as by means of short pins 97 on the sheet edge 96 for releasible coupling into suitable shaped slots 98 on the upper frame member 46 (FIG. 19). With this construction, the two wall panels 82 are slidably mounted at opposite side of the upper frame member 46, for adjustably filling a residual space between the frame member 46 and the adjacent side frame 48 of the open window 12. Set screws 100 (FIG. 20) releasably lock the panels 82 is the selected extension position. FIGS. 21 and 22 respectively illustrate the pair of extensible wall panels 82 at opposite sides of the upper frame member 46, when the pet enclosure 10 is installed through an open window 12 of the double hung type, with the movable sash 52 engaging an upper margin of the upper frame member 46 and the two horizontally extensible wall panels 82.

Figure 10:
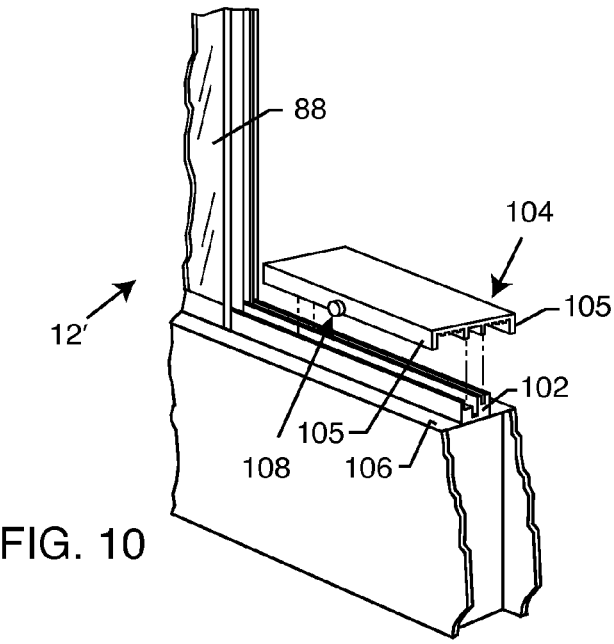
FIG. 10 is a fragmented perspective view of the open residence window, and depicting an adapter plate in exploded relation for mounting over a window slide track.
Figure 11:
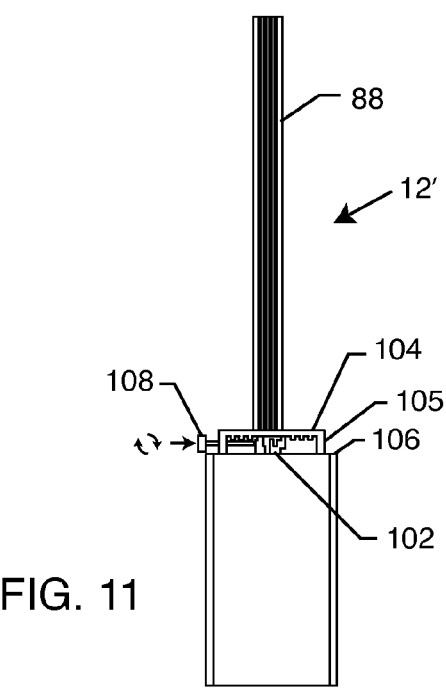
FIG. 11 is a fragmented vertical elevational view showing the adapter plate mounted over a window slide track.
Figure 23:
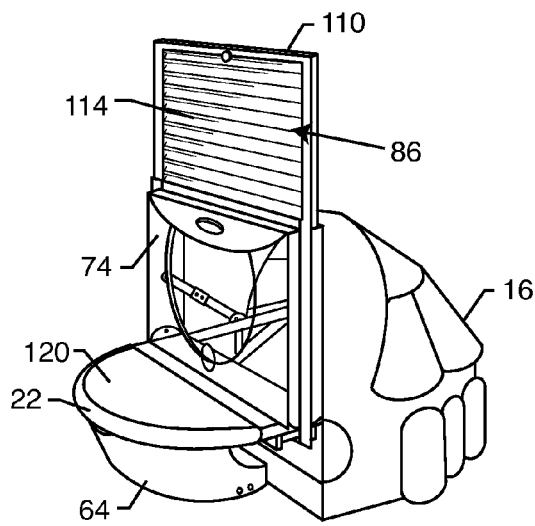
FIG. 23 is an inboard-side perspective view similar to FIG. 18, but further illustrating an expansion wall adapter including a vertically extensible wall panel for use in a sliding window.
Figure 25:
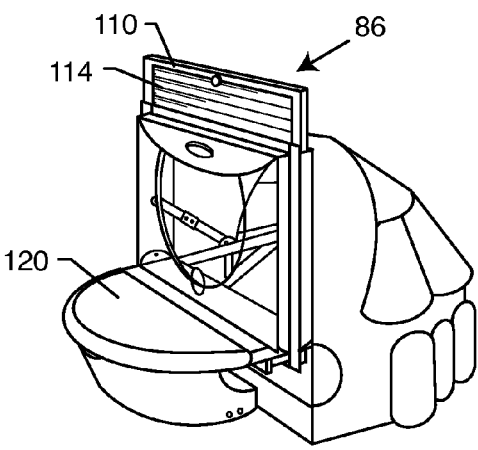
FIG. 25 is an inboard-side perspective view similar to FIG. 23, but showing the extensible wall panel in a partially extended position.
Figure 24:
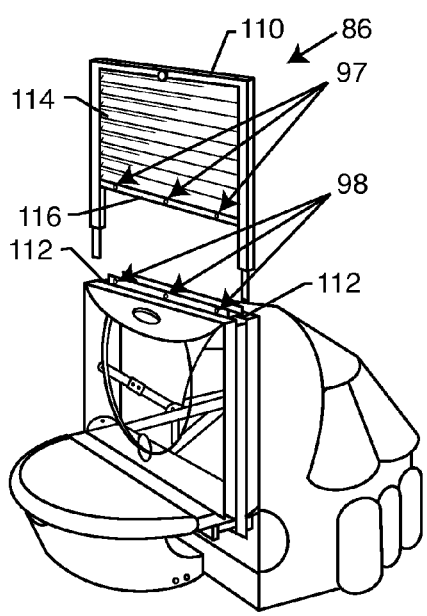
FIG. 24 is an inboard-side perspective view similar to FIG. 23, but showing the extensible wall panel in exploded relation.
Figure 26:
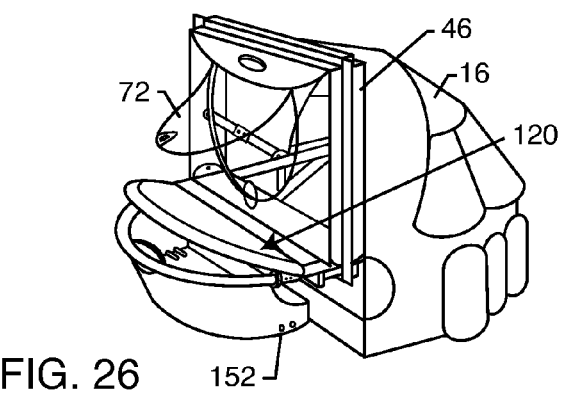
FIG. 26 is an inboard-side perspective view similar to FIG. 2, and illustrating a removably mounted threshold member.
Figure 27:
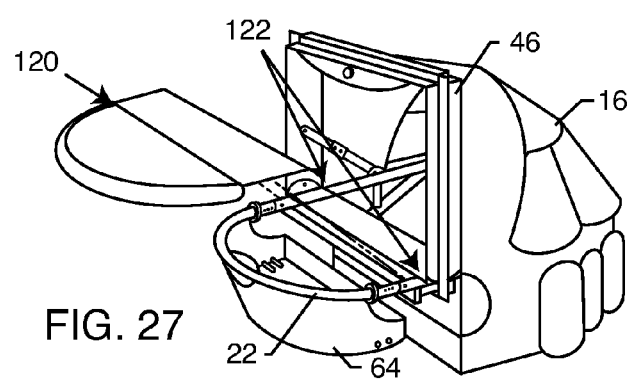
FIG. 27 is an inboard-side perspective view similar to FIG. 26, and showing the threshold member in exploded relation.
Figure 28:
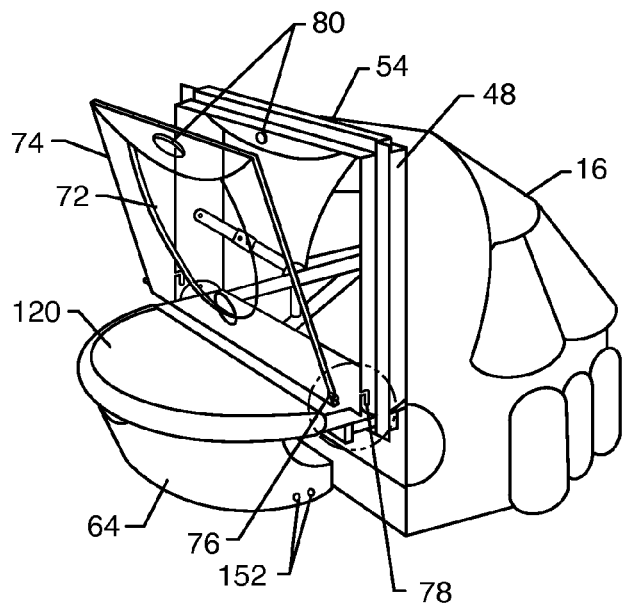
FIG. 28 is an inboard-side perspective view similar to FIG. 2, and depicting a divider panel in exploded relation.
Figure 29:
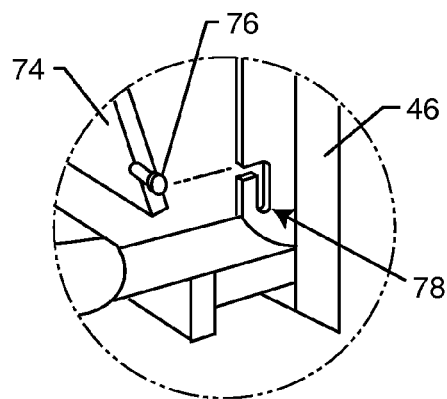
FIG. 29 is an enlarged fragmented perspective view corresponding generally with the encircled region 29 of FIG. 28.
Figure 30:
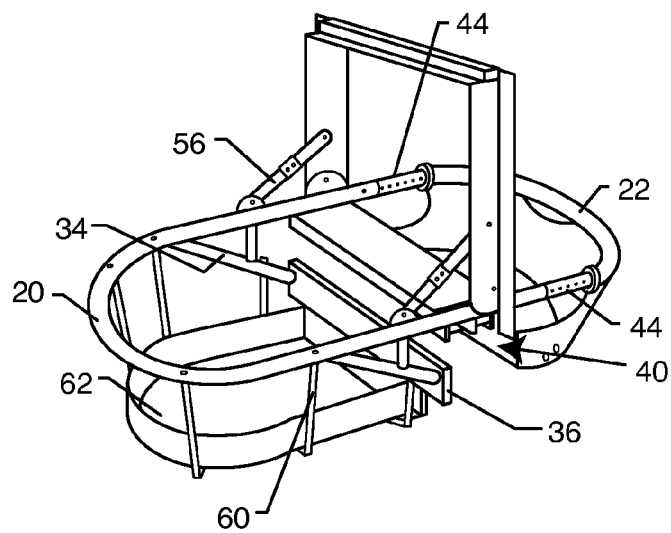
FIG. 30 is an outboard-side perspective view of the articulated frame, similar to FIG. 5, and further illustrating a litter box carried by the articulated frame.
Figure 31:
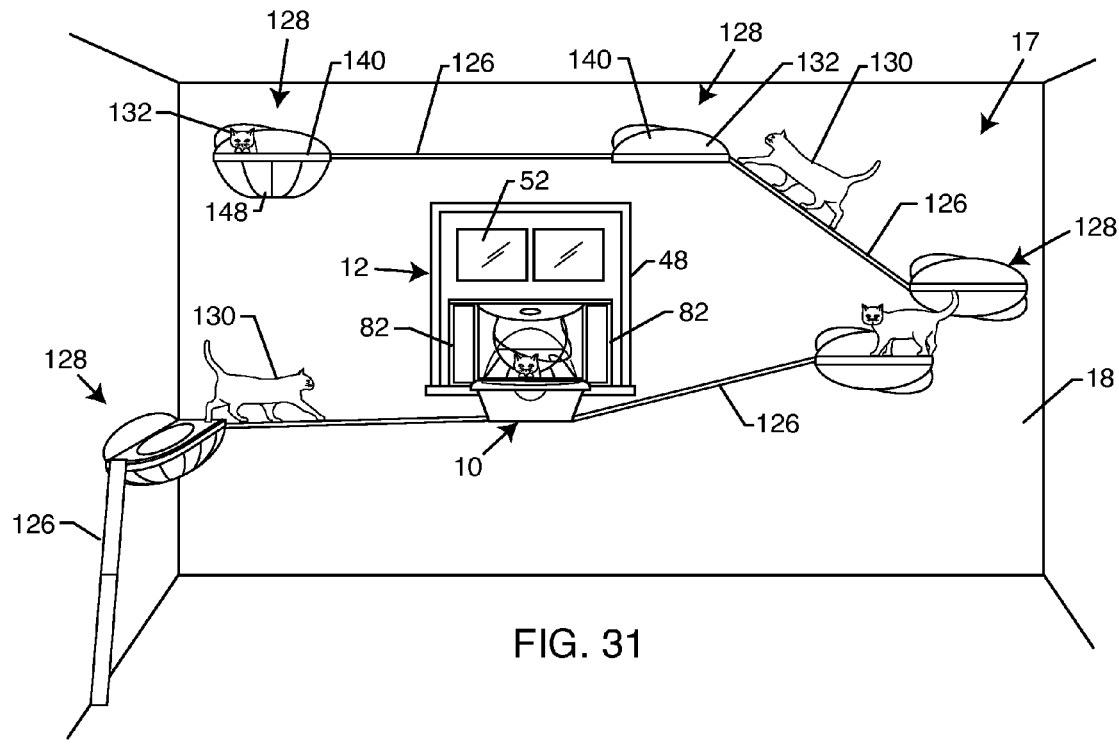
FIG. 31 is a somewhat schematic elevation view showing the pet habitat including the window-mounted tent-type pet enclosure in combination with a cat perch and walkway system.
Figure 32:
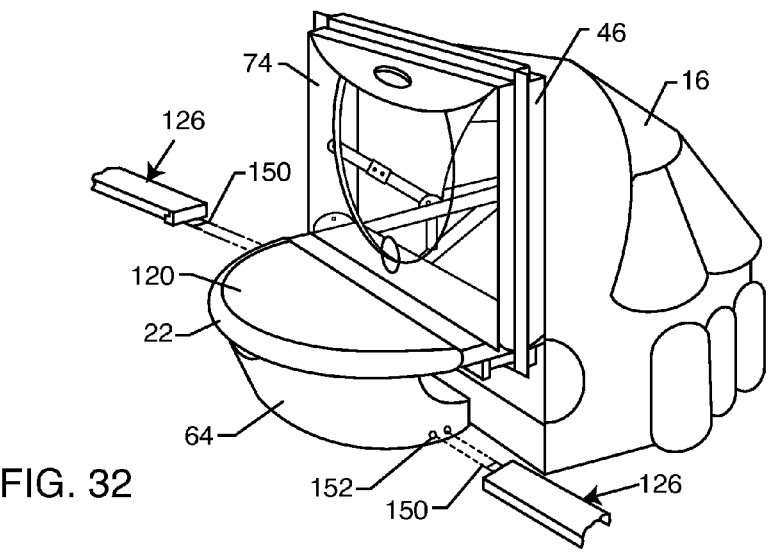
FIG. 32 is a fragmented and exploded inboard-side perspective view similar to FIG. 2, and further illustrating assembly of catwalk components with the window-mounted tent-type pet enclosure.

FIGS. 23-25 illustrate a similar but vertically extensible wall panel 86 for use with a sliding-type window, of the type shown in FIGS. 10-11. In this regard, such sliding-type window comprises a horizontally slidable sash 88 carried for sliding movement along a track 102 mounted at the window sill for sash movement between open and closed positions. An adapter plate 104 may be used to cover the window track 102, thereby providing a broader-based surface for stable clamp-on mounting of the pet enclosure 10 through the open window. FIGS. 10-11 show the adapter plate 104 having an inverted, shallow U-shaped configuration sized to seat opposite side legs 105 thereof on the window sill 106, in combination with at least one and preferably multiple fasteners 108 such as an elongated set screw received through one of the side legs 105 to bear against a side margin of the upstanding track 102.

With the pet enclosure 10 mounted through the open sliding-type window in snug relation between one side frame of the window and the movable sash 88, preferably following placement of the adapter plate 104, the vertically extensible wall panel 86 is adjusted to vertically fill any residual space between upper side of the upper frame member 46 and the top of the open window frame (not shown). In this regard, the vertically extensible wall panel 86 also comprises an open-ended frame element 110 having opposed side frame legs for slide-fit, telescopic reception into vertically open-ended channels 112 formed respectively at the opposed sides of the upper frame member 46 of the articulated frame 14. This open-sided frame element 110 supports an accordion-like collapsible or pleated wall sheet 114 having an inboard or lower edge 116 (FIG. 24) adapted for releasible connection to the adjacent side margin of the upper frame member 46, as by means of pins 97 and slots 98 (FIG. 24) similar to those shown and described in FIG. 19. Accordingly, the wall panel 86 can be vertically adjusted in height as viewed in FIGS. 23-25 for filling any residual space between the pet enclosure 10 and the top of the sliding window opening. The panel 86 may be releasibly locked in place by means of set screws similar to those shown and described in FIG. 20.

A threshold 120 can be carried by the articulated frame 14 at the onboard or indoor side of the pet enclosure 10, as viewed best in FIGS. 1-3, 18-20, and 26-27. More specifically, with reference to FIGS. 26-27, this threshold 120 may comprise a hinged plate structure having a size and shape to fit securely, as by Velcro-type fasteners 122 or the like, over the inboard-side tubular frame element 22. In a preferred form, the threshold 120 carries a soft and comfortable material lining the upper side thereof, such as a carpeted surface, to provide a small perch upon which a pet such as a cat may rest at the indoor side of the window 12. The threshold 120 fits over the underlying tray 64 in a removable manner, whereby the tray 64 provides a storage compartment which may be accessed quickly and easily by upward pivoting of the threshold 120.

FIGS. 31-39 illustrate the cat perch and walkway system 17 for use in combination with the window mounted pet enclosure 10, to provide an overall habitat for pet use and enjoyment. As shown best in FIG. 31, this perch and walkway system 17 comprises multiple walkway ramps 126 interconnecting the pet enclosure 10 with perch units 128 mounted at selected positions on the indoor side of the building wall or walls 18, or otherwise interconnecting perch units 128 with each other. As shown, the ramps 126 have an adjustable-length construction and may be oriented to extend horizontally or with selected inclination between adjacent perch units 128 and/or the pet enclosure 10. This system 17, in combination with the pet enclosure 10, provided a unique and enjoyable habitat for one or more cats 130 or the like. The system may be entirely wall mounted, if desired, to avoid use of floor space otherwise needed for use by human occupants.

Figure 33:
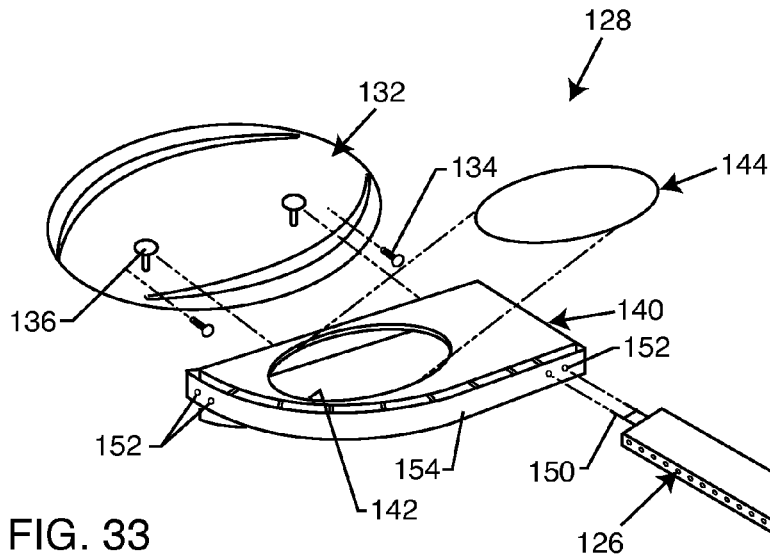
FIG. 33 is an exploded perspective view illustrating components of the cat perch and walkway system.
Figure 34:
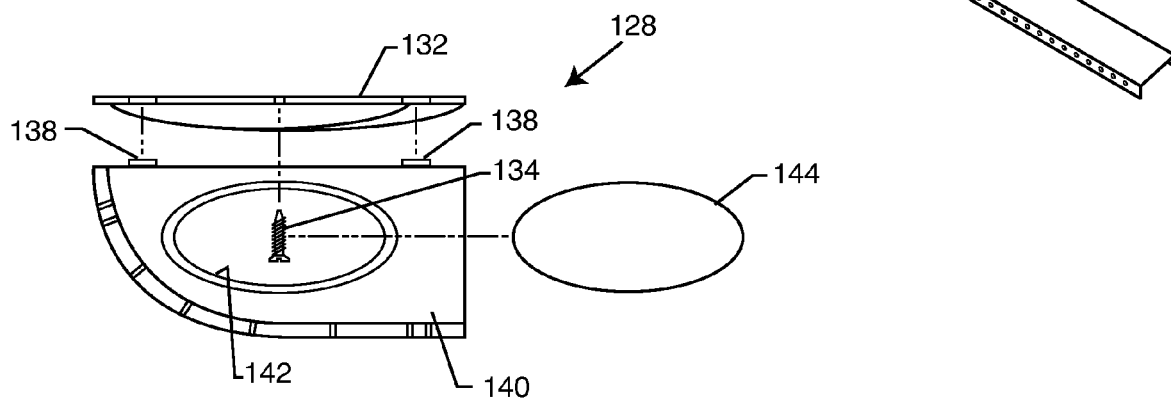
FIG. 34 is an exploded top plan view of components of the cat perch and walkway system.
Figure 35:
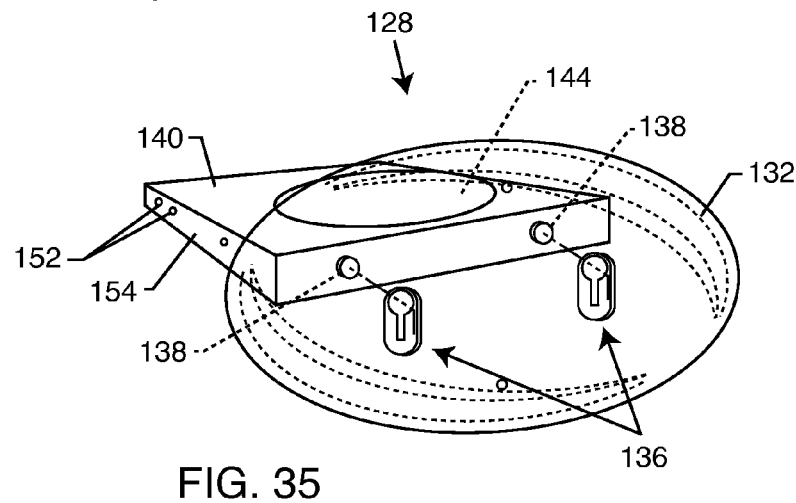
FIG. 35 is a rear exploded perspective view of the components shown in FIG. 34.

FIGS. 33-35 depict an exemplary perch unit 128. As shown, each perch unit 128 may comprise a base plate 132 adapted for secure mounting at a selected location onto the building wall 18, as by means of one or more suitable mounting screws 134. Each base plate 132 includes at least one and preferably multiple keyhole slots 136 for receiving and supporting headed pins 138 at a rear margin of a perch platform 140, thereby permitting quick and easy assembly of the perch unit 128.

As shown in FIGS. 33-35, each perch platform 140 may include a central opening 142 formed therein. In one preferred form, this central opening 142 may be closed by a removably mounted plate element 144 which cooperates with the remainder of the perch platform to define a soft, preferably carpeted upper surface. In a variation depicted in FIG. 36, small bowls 146 may be removably attached to an edge margin of the perch platform 140 for containing cat food and water. In another variation as shown in FIG. 37, the plate element 144 can be removed and a depending basket 148 mounted at the underside of the perch platform 140. In this configuration, a cat may nest and/or sleep in the suspended basket 148.

Each ramp 126 is designed for quick and easy assembly with the pet enclosure 10 and/or with the perch units 128, as by means of detent pins 150 protruding from opposite ends of the ramp 126 for snap-fit reception into pre-formed ports 152 in the tray 64 at the inboard side of the pet enclosure 10, or alternately at predetermined locations in an edge flange 154 of each perch platform 140. FIGS. 38-39 show these detent pins 150 carried by brackets 156 mounted at opposite ends of each ramp 126.

In addition, the ramps 126 desirably have a telescopically length adjustable construction as by means of a pair of ramp elements 126a and 126b interconnected by a releasible ratchet 158 and pawl 159 mechanism. This mechanism accommodates lengthwise sliding adjustment of the ramp elements 126a, 126b relative to each other to form a ramp structure having the desired length spanning or bridging between the perch and/or pet enclosure structures.

In use, with the pet enclosure 10 mounting at the open window 12, and with one or more of the cat perch units 128 mounted on the building wall 18, the ramps 126 are quickly and easily connected between the various structures to provide the overall walkway system 17. One or more cats 130 may enjoy the outdoor-mounted pet enclosure and/or litter box carried thereby, in combination with the indoor-mounted ramps and perch units.

A variety of further modifications and improvements in and to the improved pet habitat of the present invention will be apparent to those persons skilled in the art. Accordingly, no limitation on the invention is intended by way of the foregoing description and accompanying drawings, except as set forth in the appended claims.

What is claimed is:

1. A cat perch and walkway system for mounting onto a building wall, said system comprising:
   a pair of wall-mounted cat perch units each including a perch platform; and
   at least one walkway ramp, said ramp being coupled between said pair of perch units.

2. The system of claim 1 wherein said at least one walkway ramp is length adjustable.

3. The system of claim 1 further including at least one bowl element carried by said at least one perch unit.

4. A cat perch and walkway system for mounting onto a building wall, said system comprising:
   at least one wall-mounted cat perch unit including a perch platform;
   at least one walkway ramp coupled to said perch unit; and
   a window-mounted pet enclosure, and wherein said at least one walkway ramp comprises a ramp connected between said cat perch unit and said pet enclosure.

5. A cat perch and walkway system for mounting onto a building wall, said system comprising:
   at least one wall-mounted cat perch unit including a perch platform; and
   at least one walkway ramp coupled to said perch unit; and wherein said perch platform has an opening formed therein, and further including a basket member suspended from said perch platform and accessible through said opening.

* * * * *